United States Patent [19]
Franz

[11] Patent Number: 5,878,556
[45] Date of Patent: Mar. 9, 1999

[54] LAWN EDGE WITH ROTATABLE SHIELD

[76] Inventor: Robert Franz, 1096 S. Chateau Pt., Inverness, Fla. 34450-3565

[21] Appl. No.: 27,787

[22] Filed: Feb. 23, 1998

[51] Int. Cl.$^6$ .................................................... A01D 34/84
[52] U.S. Cl. ................................ 56/12.7; 30/276; 172/15
[58] Field of Search ............................ 30/276, 347, 286; 56/12.7, 17.4, DIG. 20, DIG. 24, 17.2, 17.5, 320.1, 320.2; 172/13, 14, 15, 17, 508, 510

[56] References Cited

U.S. PATENT DOCUMENTS

| Re. 34,815 | 1/1995 | Byrne | 172/15 |
|---|---|---|---|
| 3,872,930 | 3/1975 | Campbell | 172/15 |
| 4,268,964 | 5/1981 | Moore | 30/276 |
| 4,928,457 | 5/1990 | Laperle | 56/12.7 |
| 5,414,934 | 5/1995 | Schlessmann | 30/276 X |
| 5,423,126 | 6/1995 | Byrne | 30/276 |

*Primary Examiner*—Thomas B. Will
*Assistant Examiner*—Robert Pezzuto

[57] ABSTRACT

The instant invention relates to a lawn trimmer and an associated shield. The shield, in the preferred embodiment, is entirely formed from an impact resistant plastic. Additionally, the shield is defined by both an inner peripheral region and an outer peripheral region. An annular raised ring serves to define the boundary between these inner and outer regions. This shield is adapted to be removably secured to the drive shaft of a lawn trimmer. The interconnection between the drive shaft and shield is such that the shield can be rotated independent of the drive shaft. Such independent rotation of the shield allows the trimmer to be easily guided along either horizontal or vertical surfaces. Lastly, a spool of cutting filament is adapted to be removably secured to the drive shaft. The construction of the present invention allows for the removal and replacement of both the filament spool and the shield.

1 Claim, 3 Drawing Sheets

LAWN EDGE WITH ROTATABLE SHIELD

BACKGROUND OF THE INVENTION

1. Field of the Invention

The present invention relates to a lawn trimmer and more particularly pertains to a rotatable trimmer shield.

2. Description of the Prior Art

The use of a lawn trimmers is known in the prior art. More specifically, such lawn trimmers are known to consist basically of familiar, expected and obvious structural configurations, notwithstanding the myriad of designs encompassed by the crowded prior art which have been developed for the fulfillment of countless objectives and requirements.

By way of example, U.S. Pat. Nos. 4,959,904 and 4,203,212 Proulx discloses a simple flail feed out mechanism for a rotary mower. U.S. Pat. No. 3,139,940 to Randell discloses a lawn edger construction. U.S. Pat. Nos. 34,815 and 5,115,870 to Byrne disclose a flexible flail trimmer with combined guide and guard. U.S. Pat. No. 4,458,419 to Proulx discloses a simplified flail feedout mechanism for a rotary mower. Lastly, U.S. Pat. No. 4,145,809 to Proulx discloses a rotary mower cutting head with flexible cutting blades.

In this respect, the lawn trimmer of the present invention substantially departs from the conventional concepts and designs of the prior art, and in so doing provides an apparatus primarily developed for the purpose of enhancing trimming efficiency.

Therefore, it can be appreciated that there exists a continuing need for improvement in lawn trimmer designs. In this regard, the present invention substantially fulfills this need.

SUMMARY OF THE INVENTION

In view of the foregoing disadvantages inherent in the known types of lawn trimmers now present in the prior art, the present invention provides a lawn trimmer with an independently rotatable trimmer shield. As such, the general purpose of the present invention, which will be described subsequently in greater detail, is to provide a rotatable trimmer shield for facilitating movement of the trimmer along a linear path.

To attain this, the present invention essentially comprises a lawn trimmer and an associated shield. The shield, in the preferred embodiment, is entirely formed from an impact resistant plastic. Additionally, the shield is defined by both an inner peripheral region and an outer peripheral region. An annular raised ring serves to define the boundary between these inner and outer regions. This shield is adapted to be removably secured to the drive shaft of a lawn trimmer. The interconnection between the drive shaft and shield is such that the shield can be rotated independent of the drive shaft. Such independent rotation of the shield allows the trimmer to be easily guided along either horizontal or vertical surfaces. Lastly, a spool of cutting filament is adapted to be removably secured to the drive shaft. The construction of the present invention allows for the removal and replacement of both the filament spool and the shield.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotatable trimmer shield which can rotate independent from the trimmer filament.

It is another object of the present invention to provide a trimmer shield which is easily replaceable.

It is a further object of the present invention to provide a trimmer wherein both the filament spool and shield can be easily replaced.

An even further object of the present invention is to provide a lawn trimmer which is susceptible of a low cost of manufacture with regard to both materials and labor, and which accordingly is then susceptible of low prices of sale to the by consuming public, thereby making such lawn trimmer economically available to the buying public.

Still another object of the present invention is to provide a trimmer shield construction which enables such shield to be positioned upon lawn trimmers of various models and constructions.

Lastly, it is an object of the present invention to provide a new and improved lawn trimmer. Such trimmer includes a handle end for use in maniuplating, a cutting end, and an intermediate extent therebetween. The lawn trimmer further includes a rotatable drive member which extends from the cutting end of the trimmer. The drive member is defined by a distal end, a proximal end, and an axis, and a threaded aperture formed at the distal end of the drive member. A set of ball bearings are secured about a periphery of the drive member. The ball bearings are for use in permitting the independent rotation of the shield about the axis of the rotatable drive member. A plastic disc shaped shield is included, such shield has an inner peripheral area and an outer peripheral area. The inner peripheral area includes a centrally located aperture. An annular raised ring is positioned intermediate the inner and outer peripheral areas, with the inner area being further defined by an inwardly extending circular depression. The outer area is further defined by a fustrocone with a depending skirt at an outermost periphery. An upper series of strengthening ribs are included which radiate outwardly from the centrally located aperture. The upper ribs are positioned upon an upper surface of the shield. A lower series of strengthening ribs are included and radiate outwardly from the centrally located aperture, these lower ribs are positioned upon a lower surface of the shield. A ball bearing race is formed within the centrally located aperture and is removably secured over the set of ball bearings. The fit between the ball bearings and race is sufficient to hold the shield in place and allow for the rotation of the shield independent of the drive member. A spool is also included which has an outer periphery and an axially located aperture formed through the spool. A length of filament is secured about the spool and adapted to be spent therefrom. The distal end of the drive member is adapted to be inserted within the aperture of the spool. Additionally, a threaded securement member is adapted to be threadably interconnected to the distal end of the drive member and thereby removably secure the spool to the drive member such that rotation of the drive member causes the rotation of the spool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
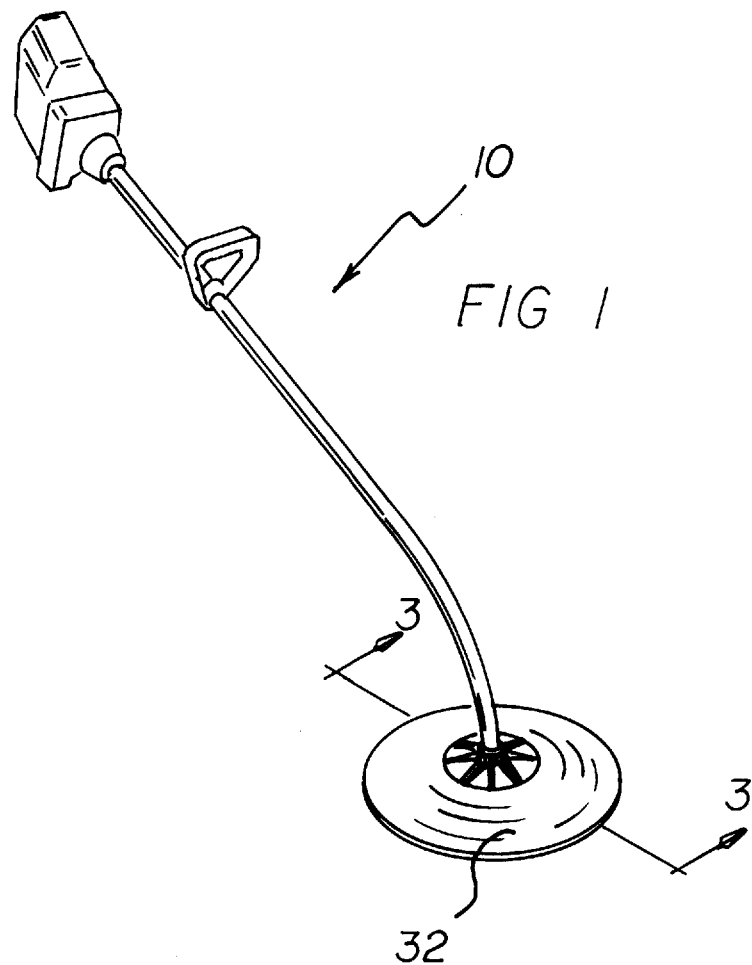
FIG. 1 perspective view of the lawn trimmer of the present invention.
Figure 2:
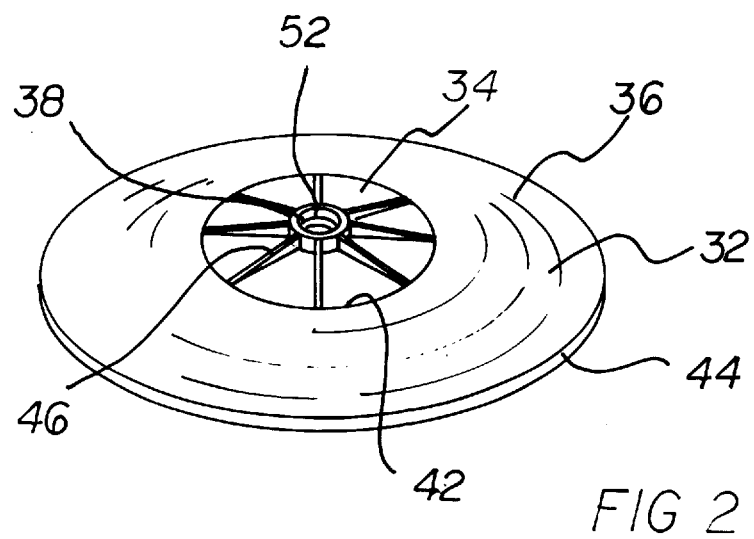
FIG. 2 is view of the shield removed from the trimmer.
Figure 3:
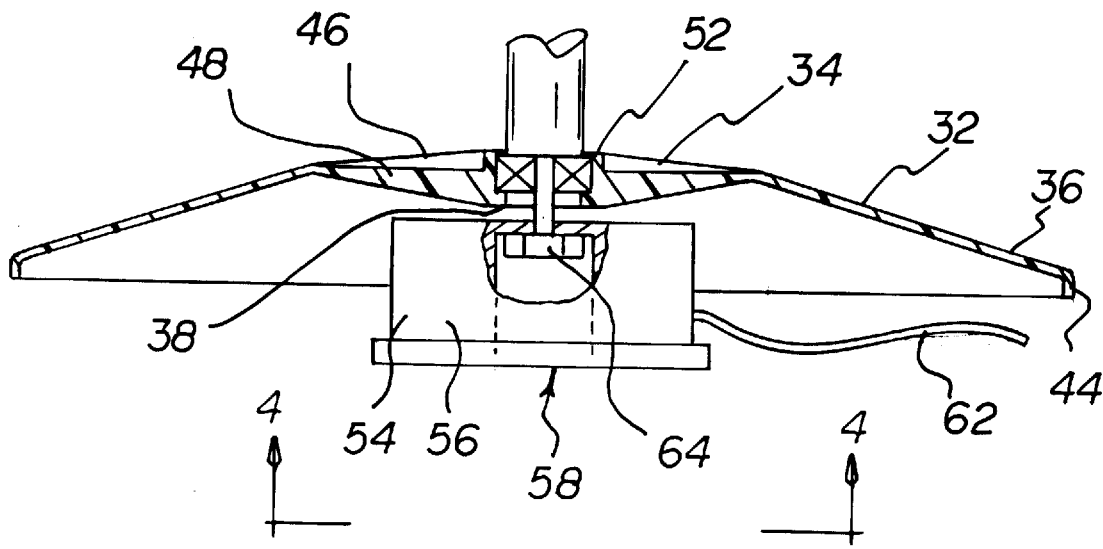
FIG. 3 is a sectional view taken along line 3—3 of FIG. 1.
Figure 4:
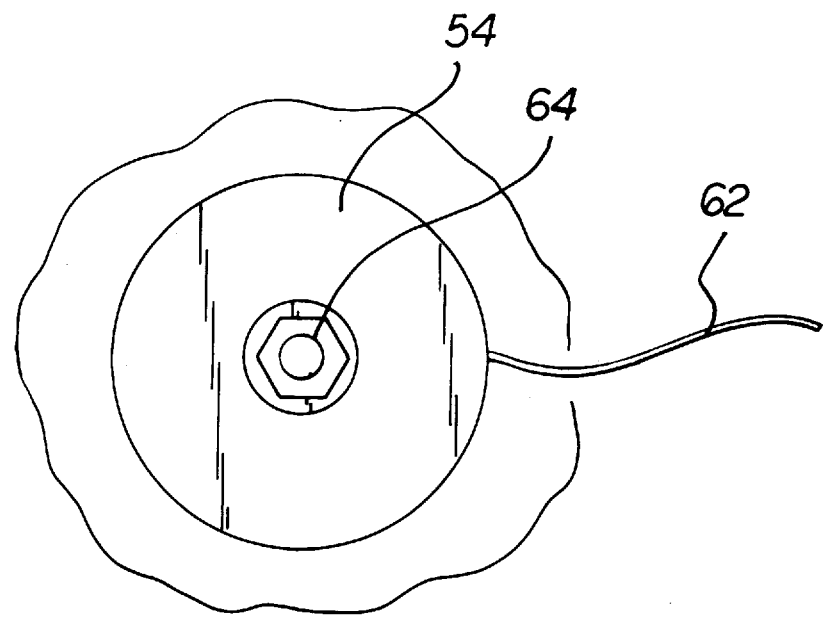
FIG. 4 is a view taken along line 4—4 of FIG. 3.

With reference now to the drawings, and in particular to FIG. 1 thereof, the lawn trimmer shield of the present invention is depicted. The shield, in the preferred embodiment, is entirely formed from an impact resistant plastic. Additionally, the shield is defined by both an inner peripheral region and an outer peripheral region. An annular raised ring serves to define the boundary between these inner and outer regions. This shield is adapted to be removably secured to the drive shaft of a lawn trimmer. The interconnection between the drive shaft and shield is such that the shield can be rotated independent of the drive shaft. Such independent rotation of the shield allows the trimmer to be easily guided along either horizontal or vertical surfaces. Lastly, a spool of cutting filament is adapted to be removably secured to the drive shaft. The construction of the present invention allows for the removal and replacement of both the filament spool and the shield. The various components of the present invention, and the manner in which they interrelate, will be described in greater detail hereinafter.

With reference to FIG. 1, the lawn trimmer 10 of the present invention is depicted. Such trimmer 10 is defined by a handle end ,for use in manipulating the trimmer, and a cutting end. Additionally, an intermediate extent is positioned inbetween the handle and cutting ends.

Figure 5:
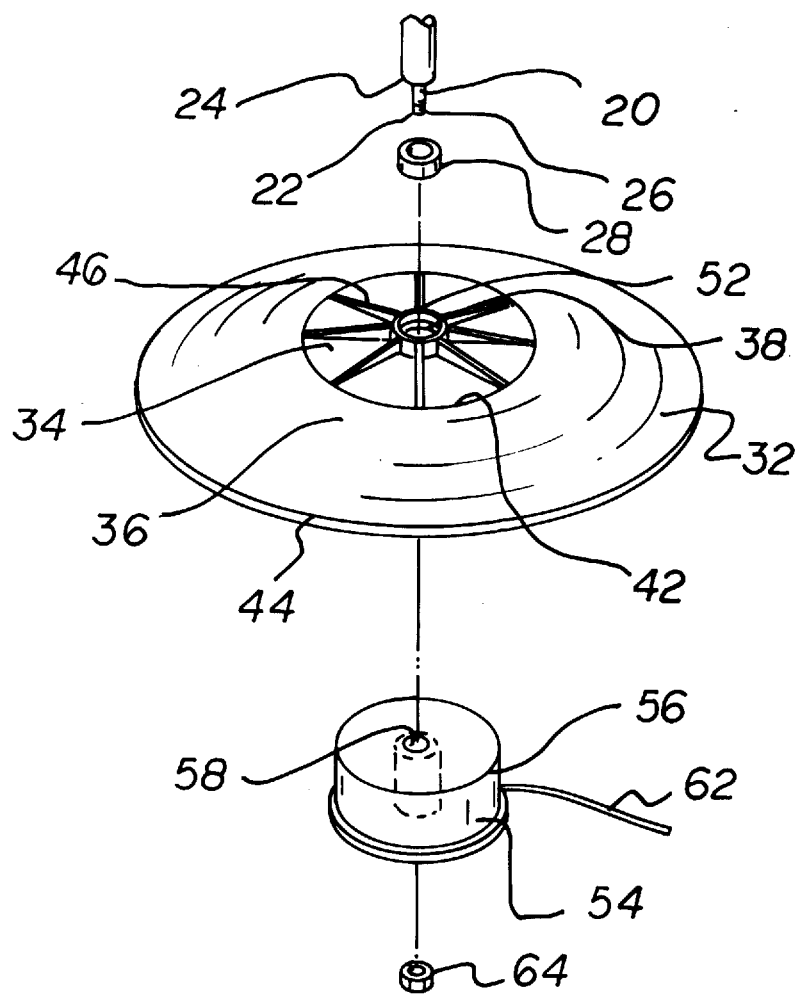
FIG. 5 is an exploded view depicting the drive shaft; bearings; shield; spool; and securement member.

With reference now to FIG. 5, the trimmer 10 also includes a rotatable drive member 20 which extends outwardly from the cutting end of the trimmer 10. Such drive member 20 is defined by a distal end 22, a proximal end 24, and an axis. Additionally, in the preferred embodiment, a threaded aperture 26 is formed at the distal end 22 of the drive member 20. The function of this threaded aperture 26 will be described in greater detail hereinafter.

With continuing reference to FIG. 5, a set of ball bearings 28 is secured about a periphery of the drive member 20, with the number of ball bearings being sufficient to enable the entire periphery of the drive shaft 20 to covered. Additionally, such ball bearings 28, in the preferred embodiment, are encased in a packing. Such packing ensures that all of the ball bearings 28 maintain a proper spaced relationship from one another. Such packing, however, in no way interferes with the rotational freedom of the individual bearings. In a manner to be described more fully hereinafter, these ball bearings 28 allow for the independent rotation of the trimmer shield 32 about the axis of the drive member 20.

With continuing reference to FIG. 5, the plastic disc shaped shield 32 of the trimmer 10 is depicted. Such shield 32 is defined by both an inner peripheral area 34 and an outer peripheral area 36. The inner peripheral area 34 includes a centrally located aperture 38. Additionally, an annular raised ring 42 is positioned intermediate the inner and outer peripheral areas. The inner area 34, in turn, is further defined by an inwardly extending circular depression. Additionally, the outer area 36 is further defined as a fustrocone shape with a depending skirt 44 at its outermost periphery. The plastic disc 32 of the present invention also incorporates strengthening ribs for reinforcement. More specifically, an upper series of strengthening ribs 46 are positioned to radiate outwardly from the centrally located aperture 38. Such upper ribs 46 are positioned upon an upper surface of the shield 32. Additionally, a lower series of strengthening ribs 48 are positioned to radiate outwardly from the centrally located aperture 38, with the lower ribs 48 being positioned upon a lower surface of the shield 32. This arrangement of upper and lower radiating ribs gives the entire shield 32 a greater degree of rigidity.

The shield 32 is secured to the drive member 20 of the trimmer 10 in such a fashion as to allow for the independent rotation of the shield 32. To achieve this, bearing means are employed in interconnecting the aperture 38 of the shield 32 to the distal end 22 of the drive member 20. More specifically, the rotatable shield 32 includes a ball bearing race 52 which is formed within the centrally located aperture 38. This race 52 is adapted to be removably secured over the set of ball bearings 28. Thus, the fit between the ball bearings 28 and race 52 is sufficient to hold the shield 32 in place and, at the same time, allow for the rotation of the shield independent of the drive member 20. The result is a trimmer wherein the filament can be guided along a path via the rotatable shield 32.

The cutting end of the trimmer 10 is adapted to support a spool 54 of filament 62. Such filament 62, when rotated via the drive shaft 20, is employed in cutting weeds, in a manner known in the trimmer art. The spool 54 upon which is filament 62 is wound is defined by an outer periphery 56 as well as an axially located aperture 58 formed therethrough. As indicated, a length of filament 62 is adapted to be secured about the periphery 56 of the spool 54. Such filament 62 can be periodically spent from the spool 54 in a conventional manner. With reference now to the exploded view of FIG. 5, the distal end 22 of the drive member 20 is adapted to be inserted within the aperture 58 of the spool 54. A threaded securement member 64 can thereafter be threadably interconnected to the distal end 22 of the drive member 20, via the threaded aperture 26 of the drive member 22. With the member so attached, the spool 54 is thereby removably secured to the drive member 20. Additionally, the interconnecting between the spool 54 and drive shaft 20 is such that rotation of the drive member 20 causes the rotation of both the spool 54 and filament 62. However, due to the presence of the ball bearings, rotation of the drive shaft does not effect rotation of the shield.

An important aspect of the present invention is the detachability of the above described components. More specifically, the threaded securement member can be removed from the threaded aperture of the drive member. With the member removed, both the filament spool and shield can be taken off the drive member. Thus, with the shield of the present invention both the filament spool and shield can readily be replaced with little effort.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the united states is as follows:

1. A lawn trimmer with a handle end for use in manipulating, a cutting end, and an intermediate extent therebetween, the lawn trimmer further comprising in combination:

a rotatable drive member extending from the cutting end of the trimmer, the drive member having a distal end, a proximal end, and an axis, a threaded aperture formed at the distal end of the drive member;

a set of ball bearings secured about a periphery of the drive member, the ball bearings for use in permitting independent rotation about the axis of the rotatable drive member;

a plastic disc shaped shield, the shield having an inner peripheral area and an outer peripheral area, the inner peripheral area having a centrally located aperture, an annular raised ring positioned intermediate the inner and outer peripheral areas, the inner area being further defined by an inwardly extending circular depression, the outer area being further defined by a fustrocone with a downwardly depending skirt at an outermost periphery, an upper series of strengthening ribs radiating outwardly from the centrally located aperture, the upper ribs being positioned upon an upper surface of the shield, a lower series of strengthening ribs radiating outwardly from the centrally located aperture, the lower ribs being positioned upon a lower surface of the shield;

a ball bearing race formed within the centrally located aperture and removably secured over the set of ball bearings, the fit between the ball bearings and race being sufficient to hold the shield in place and allow for the rotation of the shield independent of the drive member;

a spool having an outer periphery and an axially located aperture formed through the spool, a length of filament secured about the spool and adapted to be spent therefrom, the distal end of the drive member inserted within the aperture of the spool, a threaded securement member adapted to be threadably interconnected to the distal end of the drive member and thereby removably secure the spool to the drive member such that rotation of the drive member causes the rotation of the spool.

* * * * *